United States Patent
Eslambolchi et al.

(10) Patent No.: US 6,297,638 B1
(45) Date of Patent: Oct. 2, 2001

(54) METHOD FOR CONTROLLING CABLE BORING

(75) Inventors: Hossein Eslambolchi, Basking Ridge, NJ (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/503,384

(22) Filed: Feb. 14, 2000

(51) Int. Cl.[7] .................................................. G01V 3/08
(52) U.S. Cl. ................................................. 324/326; 324/67
(58) Field of Search ............................. 324/326, 207.11, 324/207.26, 67; 175/45

(56) References Cited

U.S. PATENT DOCUMENTS 5,337,002 * 8/1994 Mercer .................................. 324/326
5,644,237 * 7/1997 Eslambolchi et al. ............... 324/326
5,757,190   5/1998 Mercer .

* cited by examiner

Primary Examiner—Safet Metjahic
Assistant Examiner—S A Zaveri
(74) Attorney, Agent, or Firm—Robert B. Levy; Rohini K. Garg

(57) ABSTRACT

A boring operation performed by a boring head (18) is controlled to avoid interference with an adjacent buried conveyance (20) by first locating the conveyance and thereafter establishing a safety zone (24) thereabout. After establishing the safety zone, a check is made along the border (24a) of the safety zone adjacent the intended bore path for the presence of a monitor signal radiated by the bore head. If the bore monitor signal is detected at the safety zone border, an alert is generated.

7 Claims, 1 Drawing Sheet

METHOD FOR CONTROLLING CABLE BORING

TECHNICAL FIELD

This invention relates to a technique for controlling a cable boring operation to avoid interference with an existing underground utility conveyance.

BACKGROUND ART

Utilities, such as those providing electric, gas, water, and telephone service, often bury their conveyances (i.e., pipes and/or cables) underground for reasons of safety and aesthetics. Usually, the environment and terrain dictate the method employed for burying such conveyances. In rural areas, utilities prefer direct burial, which they accomplish by plowing or trenching the earth. In urban environments, and when crossing waterways, boring is preferred. To complete a boring operation, the utility, or a contractor under its employ, first excavates a pit at each of the opposite ends of the intended path for the conveyance. From one pit, a boring machine (auger) forces a boring head horizontally through the earth into the other pit to create a tunnel through which a utility conveyance can pass.

Underground utility conveyance burial by boring does create a certain risk. An operator must carefully control the path of the boring head to avoid contact with one or more existing underground utility conveyances buried in proximity to the path established by the boring head. For this reason, many utilities, such as AT&T, have regulations governing the minimum allowable distance permitted between the boring head and an existing underground utility conveyance. To facilitate control of the boring head, most boring head manufacturers include a transmitter (hereinafter referred to as a "sonde") in the boring head for transmitting a signal in the range of 8 kHz. to 33 kHz. The signal transmitted by the sonde radiates through the ground for detection by one or more detectors located above ground. By continuously monitoring the signal radiated by the sonde in the boring head, the operator of the boring machine can monitor the relative position of the boring head as it bores a path through the earth to avoid contact with an existing underground utility conveyance.

Unfortunately, the signal radiated by the sonde in the bore head tends to induce electromagnetic signals in other facilities, such as other underground utility conveyances, causing one or more of them to radiate signals in the vicinity of the conveyance of interest. The detectors (s) tuned to receive the signal radiated by the sonde also receive the signals induced in, and radiated by, such other facilities, especially when the sonde comes into close proximity with such other facilities, thus causing confusion regarding the actual position of the boring head. Hence, attempting to control the boring operation by continuously monitoring sonde signal can lead to errors especially when boring operations occur in close proximity to existing underground utility conveyances. Indeed, all too often, boring operations have damaged existing underground conveyances, leading to service outages and lost revenues, not to mention the cost associated with repairs.

Thus, a need exits for a technique for controlling a boring operation to reduce the risk of interference.

BRIEF SUMMARY OF THE INVENTION

Briefly, in accordance with a preferred embodiment of the invention, there is provided a method for controlling a boring operation carried out by a boring head to avoid possible interference between the boring head as it is pushed through the earth and an adjacent conveyance of interest. In accordance with the method, the location of the conveyance of interest is first established, typically by electronically locating the conveyance in a conventional manner. Thereafter, a safety zone is established about the conveyance such that the safety zone has a longitudinal boundary along the intended bore path generally parallel to, but spaced at least a prescribed distance from the conveyance. As a boring operation commences, a transmitter (referred to as a "sonde") within the boring head radiates a signal at a known frequency. Along the boundary of the safety zone, a check is made for the presence of the sonde signal with a signal detecting device or series of signal detecting devices. The signal-detecting device(s) would be calibrated to the same frequency as the signal radiating sonde used by the bore operation. The bore sonde unit radiates a signal in the frequency band of 8 kHz to 33 kHz and the signal detecting device(s) would automatically scan the immediately area surrounding the bore for the radiating sonde frequency. Once positioned along the bore path, the signal detecting unit(s) would monitor for this boring sonde frequency. If the sonde signal is detected as a result of the boring head coming too close to the safety zone boundary, an alert is issued. In response to the alert, the boring operation either ceases, or the boring head path is shifted to avoid interference with the conveyance.

DETAILED DESCRIPTION

Figure 1:
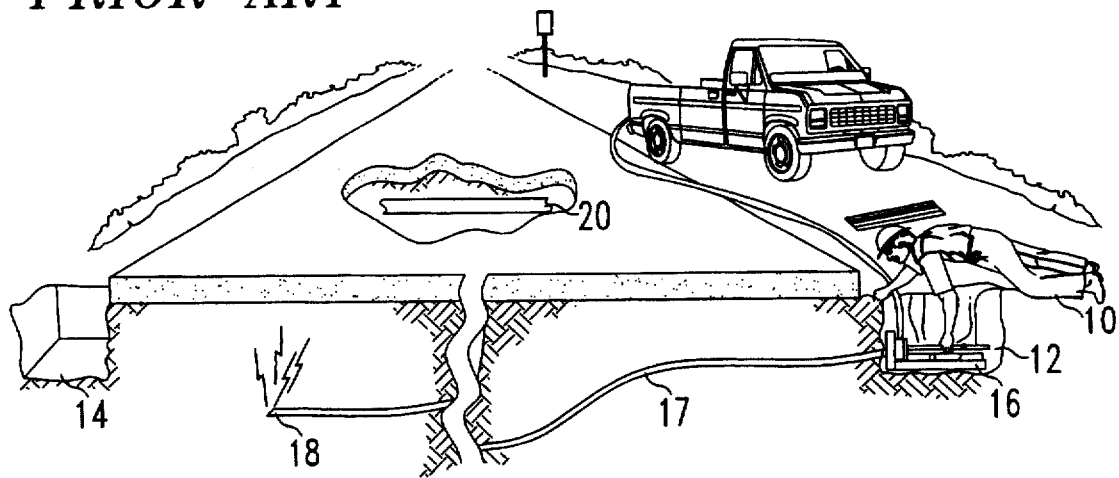
FIG. 1 depicts a boring operation according to the prior art.

FIG. 1 depicts a conventional boring operation performed when burying a utility conveyance (not shown) such as a pipe or cable. To carry out such a boring operation, a technician 10 will excavate first and second pits 12 and 14 at opposite ends of the intended path for the conveyance. Thereafter, the technician 10 will place a boring machine 16 of a conventional construction into one of the pits, such as pit 12 of FIG. 1. After placing the boring machine 16 into the pit 12, the technician 10 operates the boring machine, causing it to pay out a length of rod 17 at the end of which is a boring head 18. As the boring machine 16 pays out the rod 17, the boring head 18 advances through the earth, creating a tunnel (not shown) for receiving the conveyance for burial.

During the boring operation, the technician 10 must carefully control the path of the boring head 18 to avoid interference with adjacent utility conveyances, such as conveyance 20, buried in the vicinity of the path of the boring head. Failure to carefully control the path of the boring head 18 may result in damage to the conveyance 20. Such damage will likely cause a service outage, and in the case of a conveyance that carries oil or natural gas, a possible hazard as well. Repairing a conveyance damaged by a boring operation is expensive, not to mention lost revenue to the utility resulting from a because of a service outage caused by the damaged conveyance.

Traditionally, monitoring of the boring operation involves placing a transmitter (not shown) typically referred to as a "sonde", in the boring head 18 to generate a bore head monitoring signal typically in the range of 8 kHz to 33 kHz.

A second technician (not shown), using a hand held signal detector (not shown) of the type described in U.S. Pat. No. 5,337,002, will continuously monitor the bore head monitoring signal along the intended path for the conveyance of interest. Any deviation of the bore head monitoring signal amplitude detected by the second technician will indicate a deviation in the path of the bore head 18, prompting the need for action.

Traditional monitoring of the bore head signal amplitude to detect a deviation in the path of the bore had 18 is not without difficulties. For example, the signal radiated by the sonde within the bore 18 often induces spurious electromagnetic radiation in adjacent conveyances, leading to misdetection of the bore head monitoring signal. Consequently, the bore head 18 may strike a conveyance, causing damage thereto.

Figure 2:
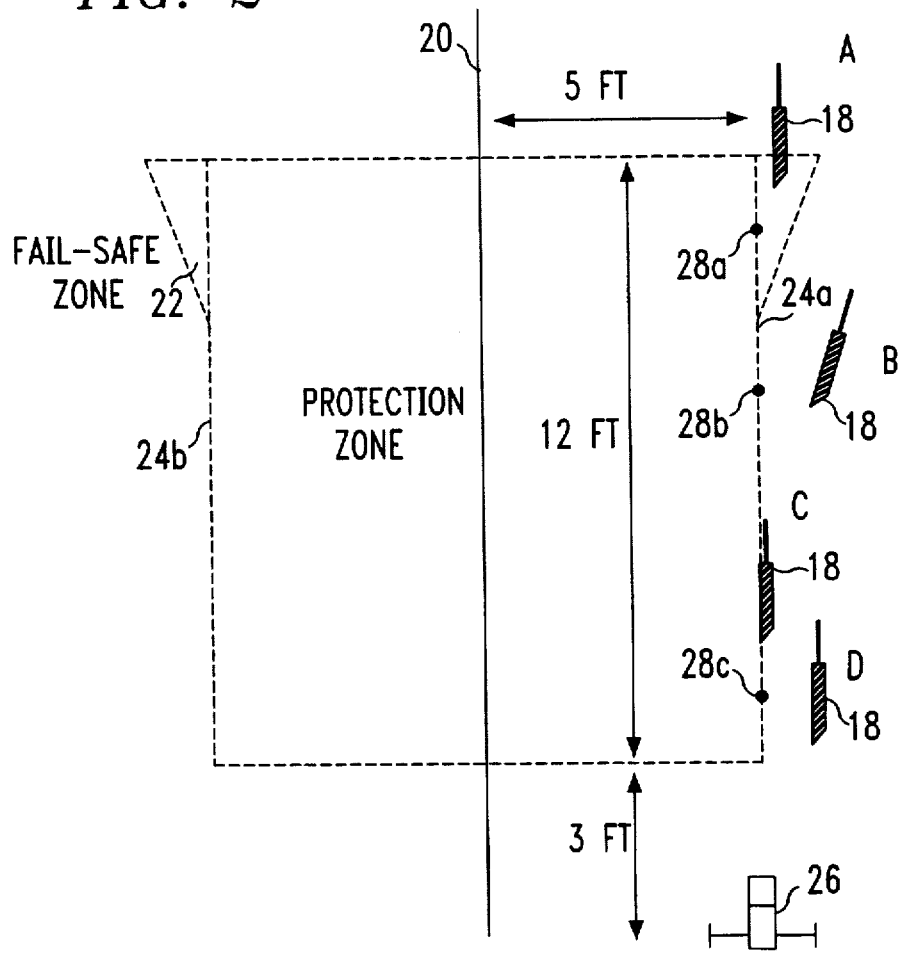
FIG. 2 depicts a boring method in accordance with a preferred embodiment of the invention.

FIG. 2 depicts a technique in accordance with a preferred embodiment the invention for controlling a boring operation to overcome the above-mentioned disadvantages of the prior art. The control method commences upon a technician first locating the conveyance 20, typically by the use of well known electromagnetic signaling techniques, such as described in U.S. Pat. No. 5,644,237, issued on Jul. 1, 1997, in the name of Hossein Eslambolchi and John Huffman, and assigned to the present assignee (herein incorporated by reference.) After establishing the location of conveyance 20, the technician will mark a safety zone 24 about the conveyance 20. The safety zone 24 has a pair of longitudinal borders 24a and 24b generally parallel to, but spaced a prescribed distance from, the conveyance 20, with one border (i.e., border 24a) lying along the intended path of the bore head. The dimensions of the safety zone 24 are such that the longitudinal borders 24a and 24b are spaced a distance at least as great as the minimum allowable distance permitted between the bore head 18 and the conveyance 20. For example, AT&T requires at least a five foot separation, while other entities may require a larger or smaller distance.

During a boring operation, the boring head 18 will radiate a bore head monitoring signal as before. However, instead of continuously monitoring the signal to detect changes in amplitude as taught by the prior art in the manner depicted in FIG. 1, in accordance with the method of the invention, a technician 26 in FIG. 2 will monitor for the presence of the bore head signal along the border (i.e. border 24a) closest to the intended path of the bore head 18. Upon detecting the bore head monitoring signal, an alert is generated. In response to the alert, the boring operation will cease, or alternatively, the path of the bore head 18 is modified.

As the bore operation begins, the sonde signal detection device(s) are calibrated to the frequency of the bore sonde by making the signal detectors operational and sensing any signal between 8 kHz and 33 kHz. The signal detector(s) would log to memory the frequency of any sonde detected within this band and would monitor for this frequency as the sonde transverses the bore path. As seen in FIG. 2, the technician 26 conducts such monitoring by positioning a series of monitoring devices, such as monitoring devices 28a, 28b and 28c, on the earth's surface along the safety zone border of interest (i.e., border 24a). Each monitoring device may take the form of the locating device described in U.S. Pat. No. 5,337,002, for example. (Rather than utilize a plurality of individual detectors 28a–28c, a technician could utilize a single detector (not shown) and physically traverse the safety zone border while the boring head travels its intended path.) At location A, at which the boring head 18 lies outside the border 24a, none of the monitoring devices 28a, 28b or 28c (or the single device carried by the technician) will detect the bore head monitoring signal. Similarly, while the bore head 18 lies at positions B and C outside the safety border 24a, none of the monitoring devices 28a, 28b or 28c (or the single device carried by the technician) will detect the bore head monitoring signal. However, once the bore head 18 crosses the safety zone border 24a at point D, at least one of the monitoring device(s) (e.g., monitoring device 28c) will typically detect the bore head monitoring signal, and generate an alert.

The above-described monitoring method affords the advantage of greater reliability because the monitoring devices 28a–28c need not concern themselves with monitoring the amplitude (strength) of the bore head monitoring signal to precisely locate the relative position of the bore head. Rather, the monitoring device(s) 28a–28c need only detect the presence of the bore head monitoring signal to determine that the bore head 18 is within the safety zone 22.

The foregoing describes a technique for controlling a boring operation.

The above-described embodiments merely illustrate the principles of the invention. Those skilled in the art may make various modifications and changes that will embody the principles of the invention and fall within the spirit and scope thereof.

What is claimed is:

1. A method for controlling a boring operation performed by a boring head to avoid interference between the boring head and an adjacent buried conveyance as the boring head travels an intended path, comprising the steps of:

locating the conveyance and establishing a safety zone thereabout such that the safety zone has a longitudinal border parallel to the intended boring head path and spaced a prescribed distance from the conveyance;

transmitting from the boring head a monitoring signal at a known frequency upon commencing upon the boring operation;

checking along the safety zone border for the presence of the monitoring signal transmitted from the boring head; and if said signal is detected, then generating an alert.

2. The method according to claim 1 further including the step of halting the boring operation in response to the alert.

3. The method according to claim 1 further including the step of shifting the path of the boring head in response to the alert.

4. The method according to claim 1 wherein the step of checking for the signal includes the step of positioning a plurality of detectors on the earth's surface spaced apart from each other along the safety zone border.

5. The method according to claim 1 wherein the signal radiated from the boring head has a frequency of 8 kHz to 33 kHz.

6. The method according to claim 1 wherein the step of checking for the bore head signal includes the step of traversing the safety border with a signal detector as the bore head travels its intended path; wherein the signal detector detects the presence of the monitoring signal.

7. The method according to claim 5 including the step of automatically scanning for a frequency within said range of 8 kHz and 33 kHz.

* * * * *